(12) United States Patent
Kestelli et al.

(10) Patent No.: US 10,043,485 B2
(45) Date of Patent: Aug. 7, 2018

(54) AMBIENT LIGHT SENSING THROUGH THE HUMAN BODY

(71) Applicant: Apple Inc., Cupertino, CA (US)

(72) Inventors: Nevzat Akin Kestelli, San Jose, CA (US); Ueyn L. Block, Menlo Park, CA (US); Serhan O. Isikman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/033,617

(22) PCT Filed: Mar. 19, 2014

(86) PCT No.: PCT/US2014/031261
§ 371 (c)(1),
(2) Date: Apr. 29, 2016

(87) PCT Pub. No.: WO2015/065516
PCT Pub. Date: May 7, 2015

(65) Prior Publication Data
US 2016/0284316 A1     Sep. 29, 2016

Related U.S. Application Data

(63) Continuation of application No. PCT/US2013/068166, filed on Nov. 1, 2013.

(51) Int. Cl.
*G06F 3/038* (2013.01)
*G09G 5/10* (2006.01)
(Continued)

(52) U.S. Cl.
CPC ............... *G09G 5/10* (2013.01); *G06F 1/163* (2013.01); *G06F 1/3206* (2013.01);
(Continued)

(58) Field of Classification Search
CPC .... G09G 5/10; G09G 5/02; G09G 2320/0624; G09G 2320/0666; G06F 1/163;
(Continued)

(56) References Cited

U.S. PATENT DOCUMENTS 3,718,399 A * 2/1973 Kalman ............... G01N 21/474
356/227
5,483,261 A    1/1996 Yasutake
(Continued)

FOREIGN PATENT DOCUMENTS

JP    2000-163031 A    6/2000
JP    2002-342033 A    11/2002

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Mark Regn
(74) *Attorney, Agent, or Firm* — Morrison & Foerster LLP

(57) ABSTRACT

A portable electronic device including one or more sensors for detecting ambient light through the user's skin is disclosed. The sensors can be optical sensors such as ambient light sensors (ALS) and/or cameras. Examples of the present disclosure include a device that can determine the intensity of ambient light and can change the operating state of the portable electronic device based on the ambient light environment. The device can also determine the type of ambient light and generate notifications to the user based on the determined type.

20 Claims, 14 Drawing Sheets

(51) Int. Cl.
*G06F 1/16* (2006.01)
*G06F 1/32* (2006.01)
*G09G 5/02* (2006.01)

(52) U.S. Cl.
CPC .......... *G06F 1/3231* (2013.01); *G06F 1/3265* (2013.01); *G09G 5/02* (2013.01); *G09G 2320/0626* (2013.01); *G09G 2320/0666* (2013.01); *G09G 2360/144* (2013.01); *Y02D 10/153* (2018.01); *Y02D 10/173* (2018.01)

(58) Field of Classification Search
CPC .... G06F 1/3206; G06F 1/3231; G06F 1/3265; G98G 2360/144; Y02B 60/1242; Y02B 60/1289
USPC .......................................................... 345/207
See application file for complete search history.

(56) References Cited

U.S. PATENT DOCUMENTS

| | | |
|---|---|---|
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,616,110 B2 | 11/2009 | Crump et al. |
| 7,663,607 B2 | 2/2010 | Hotelling et al. |
| 8,378,811 B2 | 2/2013 | Crump et al. |
| 8,479,122 B2 | 7/2013 | Hotelling et al. |
| 8,618,930 B2 | 12/2013 | Papadopoulos et al. |
| 2004/0095402 A1* | 5/2004 | Nakano .................. G06F 3/0412 346/102 |
| 2006/0197753 A1 | 9/2006 | Hotelling |
| 2008/0122821 A1* | 5/2008 | Nilsson .................. G03B 17/20 345/207 |
| 2008/0167834 A1* | 7/2008 | Herz ...................... G06F 1/3203 702/150 |
| 2009/0102830 A1* | 4/2009 | Yeo ...................... G02B 26/0841 345/214 |
| 2011/0317917 A1* | 12/2011 | Free .................... G06K 9/00234 382/167 |
| 2013/0248691 A1* | 9/2013 | Mirov ...................... G01J 1/32 250/214 AL |
| 2014/0012137 A1* | 1/2014 | Rosen .................. A61B 5/0077 600/476 |
| 2014/0155705 A1 | 6/2014 | Papadopoulos et al. |
| 2015/0054725 A1* | 2/2015 | Chen .................... G09G 3/3648 345/102 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

AMBIENT LIGHT SENSING THROUGH THE HUMAN BODY

CROSS-REFERENCE TO RELATED APPLICATIONS

This application is a National Phase application under 35 U.S.C. § 371 of International Application No. PCT/US2014/031261, filed Mar. 19, 2014, which claims the priority benefit of International Application No. PCT/US2013/068166, filed Nov. 1, 2013, the contents of which are hereby incorporated by reference in their entireties for all intended purposes.

FIELD OF THE DISCLOSURE

This relates generally to detecting ambient light in a portable electronic device, and more specifically to the detection of ambient light through the underside of the device.

BACKGROUND OF THE DISCLOSURE

A display on a portable electronic device, for example, can consume a large portion of the power used by the device. Some example displays on portable electronic devices can be liquid crystal displays (LCD), electroluminescent displays (ELD), field emission displays (FED), light-emitting diode displays (LED), organic light-emitting diode displays (OLED), quantum dot displays (QLED), and many other types of displays. However, a user's experience with the portable electronic device can be negatively impacted if the viewing experience is unacceptable. Additionally, the user's experience with the portable electronic device can be negatively impacted if the device becomes too big, bulky, cumbersome, or unattractive.

SUMMARY

The following description includes examples of ambient light sensing in a portable electronic device using the human skin. The device can include a display. The device can also include one or more sensors for detecting ambient light through the user's skin, and can change its operating state (e.g. adjust the display brightness) based on the ambient light environment. The sensors can be optical sensors such as ambient light sensors (ALS) and/or cameras. In some examples, the device can determine the type of ambient light and generate notifications to the user based on the determined type. In some examples, the device can use other sensors (e.g. biometric sensors) and other information (e.g. weather conditions), in addition to the type of detected ambient light and ambient light levels, to change its operating state or to generate information to supply to the user.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

In portable electronic devices, it is important to provide an acceptable viewing experience to the user, but the viewing experience may vary depending on the environmental conditions experienced by the user. Portable electronic devices may include displays that are illuminated by backlights. Ambient light may reflect off the surface of the display screens and alter the perceived display contrast or image colors. Accordingly, as ambient light conditions change, the brightness of a backlight may change to provide sufficient contrast between ambient light and the backlight. The devices may include one or more optical sensors that detect ambient light conditions, such as the ambient light level and/or the type of ambient light. The devices may be designed to vary brightness levels based on the detected ambient light conditions. For example, the display can appear dimmer when the user is indoors, during evening time when the sun has set, or in low lighting situations. In some examples, the display backlight can provide a reduced brightness when the user is outdoors or during situations when the user has a sufficient amount of light available for viewing. During time periods when a bright backlight is not necessary, power can be conserved by reducing the amount of light provided by the backlight or reducing the functionality of other components based on the type of ambient light.

Figure 1C:
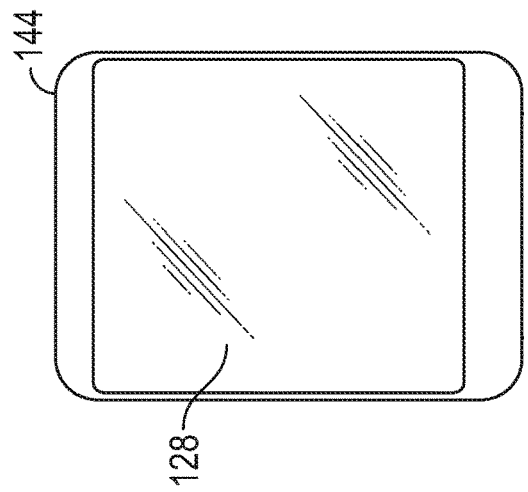
FIG. 1A-1C illustrate exemplary portable electronic devices in which examples of the disclosure may be implemented.
Figure 1B:
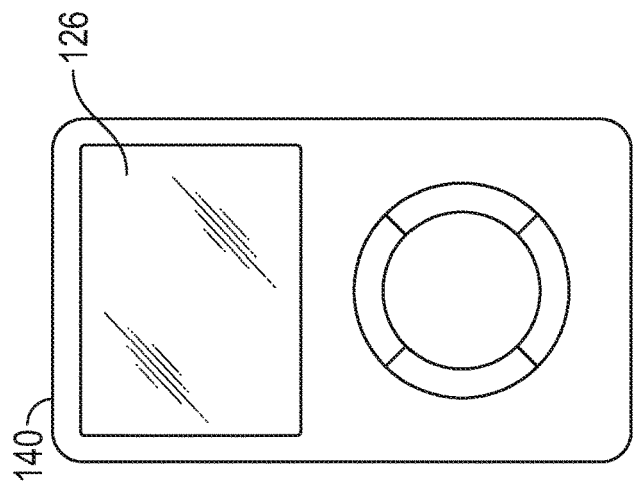
Figure 1A:
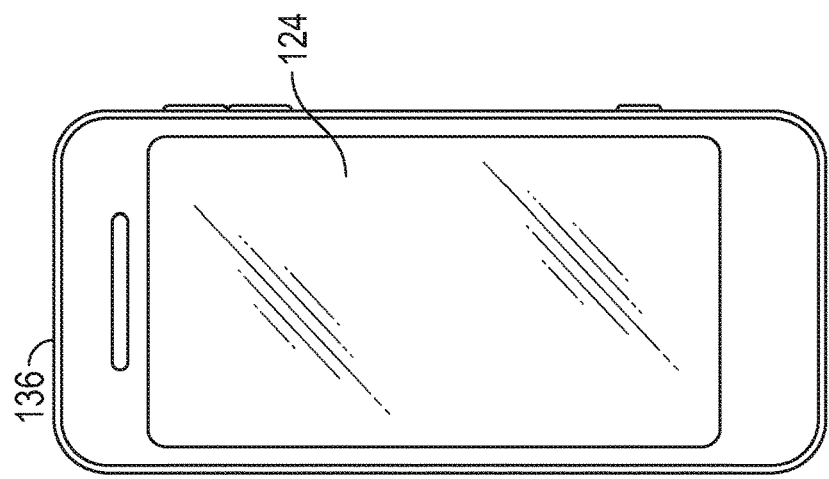

FIGS. 1A-1C illustrate exemplary portable electronic devices in which examples of the disclosure may be implemented. FIG. 1A illustrates an exemplary mobile telephone 136 that includes touch screen 124. Touch screen 124 can include a touch panel portion for touch detection, and a display portion for displaying images on the touch screen. As used throughout this disclosure, "touch screen" can refer to the touch panel portion for touch or hover detection, the display portion of the touch screen, or both. FIG. 1B illustrates an exemplary digital media player 140 that includes touch screen 126. FIG. 1C illustrates an exemplary wearable device 144 that includes touch screen 128. Touch screens 124, 126, and 128 may be based on, for example, self-capacitance or mutual capacitance, or another touch sensing technology. For example, in a self-capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of the one or more objects when they touch the touch screen. A mutual capacitance based touch system can include, for example, drive regions and sense regions, such as drive lines and sense lines. For example, drive lines can be formed in rows while sense lines can be formed in columns (i.e., drive lines and sense lines can be orthogonal). Touch pixels (touch nodes) can be formed at the intersections or adjacencies (in single layer configurations) of the rows and columns. During operation, the rows can be stimulated with an AC waveform and a mutual capacitance can be formed between the row and the column of the touch pixel. As an object approaches the touch pixel, some of the charge coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. A reduction in the charge-coupled AC waveform can be detected and measured by the touch sensing system to determine the positions of one or more objects when they touch the touch screen. In some examples, a touch screen can be multi-touch, single touch, projection scan, full-imaging multi-touch, or any capacitive touch.

The display portions of the touch screens 124, 126, and 128 may be based on display types such as liquid crystal displays (LCD), electroluminescent displays (ELD), field emission displays (FED), light-emitting diode displays (LED), organic light-emitting diode displays (OLED), or quantum dot displays (QLED). Many other types of display technologies can also be used in touch screens 124, 126, and 128, and are equally within the scope of this disclosure.

Figures 2A, 2B:
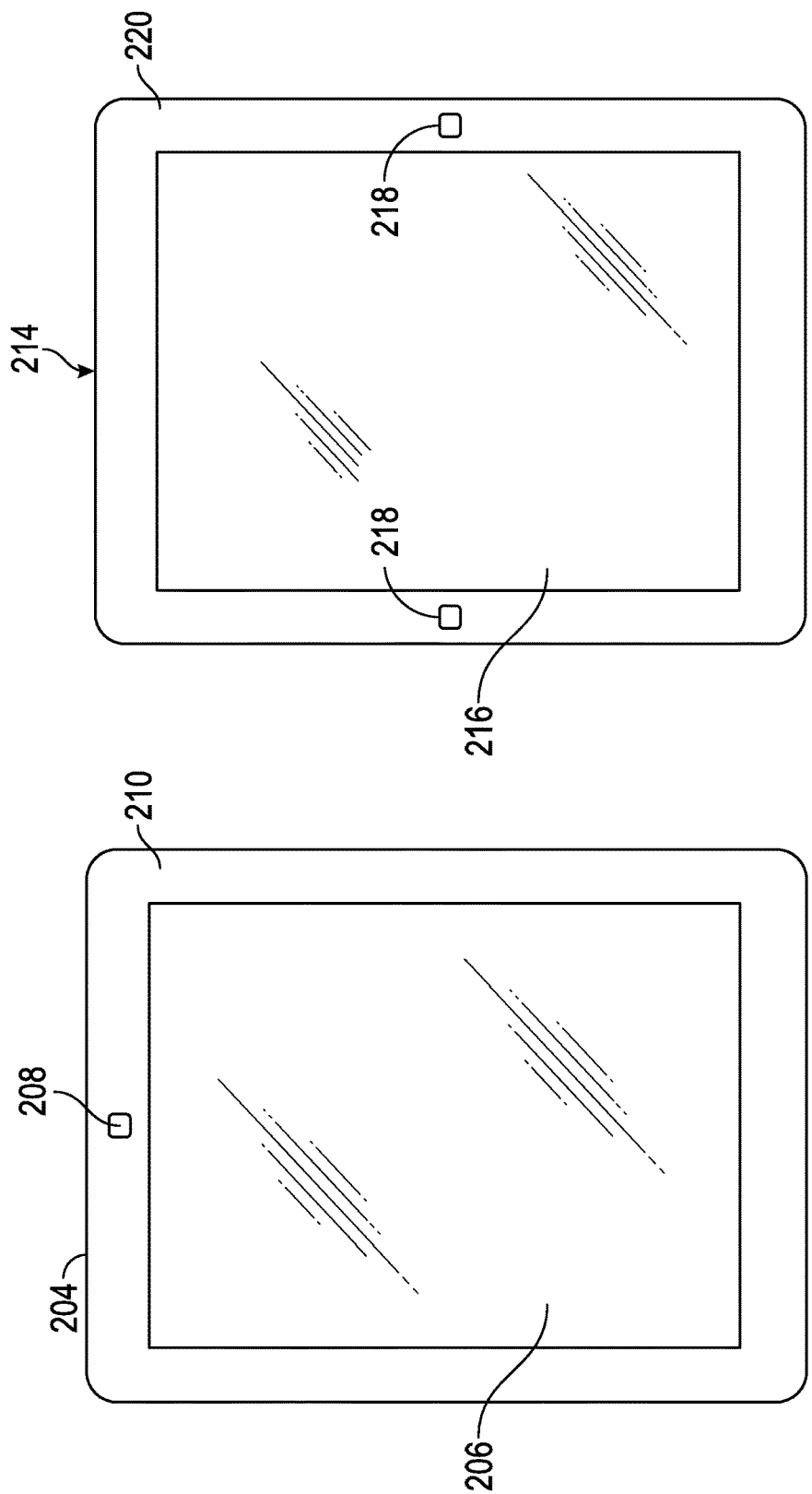
FIG. 2A illustrates an exemplary portable electronic device incorporating an optical sensor in the border region of the device.
FIG. 2B illustrates an exemplary portable electronic device incorporating multiple optical sensors in the border region of the device.

FIG. 2A illustrates an exemplary portable electronic device 204 incorporating an optical sensor 208 in the border region 210 of the device. Border region 210 can be a region of the device 204 that can exist between the edge of the touch screen 206 and the edge of the device 204. The border region 210 can be made of an opaque material, such as black glass, to disguise optical components from the user's view. Optical sensor 208 can be incorporated into border region 210 such that the optical sensor 208 does not interfere with the touch screen 206.

FIG. 2B illustrates an exemplary portable electronic device 214 incorporating multiple optical sensors 218 in the border region 220 of the device. Border region 220 can be a region of the device 214 that can exist between the edge of the touch screen 216 and the edge of the device 214. Multiple optical sensors can be used, for example, to produce a more accurate reading or to help differentiate between an ambient environment that is dark and when an optical sensor is blocked or covered by an external object.

While the functionality of the portable electronic devices in FIGS. 2A-2B can be enhanced with the optical sensors detecting ambient light, the location of the optical sensors can lead to a large device size or a device that is less aesthetically appealing. The user's experience with the device can be negatively impacted if the device becomes too big, bulky, cumbersome, or unattractive. There are many factors that determine the size of compact portable electronic devices such as laptops, PDAs, media players, cell phones, etc. In some cases, the size of the portable electronic device can be limited by the size of the operational components used therein. These components can include, for examples, microprocessor chips, printed circuit boards, displays, memory chips, batteries, indicators, or input mechanisms. Due to the portability of these devices, there can be a desire to make these operational components smaller and smaller, while maintaining functionality to perform operations. As portable electronic devices become more compact, and the number of functions performed by a given device increase, it can become more challenging to fit some of the operational components while achieving a small, compact device.

In addition to size, the placement of the optical sensors can impact the accuracy of the detection of ambient light. The optical sensors in FIGS. 2A-2B can be positioned underneath several layers, such as the cover layer of the display or the touch screen (e.g., in an OLED display, the sensor can be placed behind the display). The optical path, when positioned underneath several layers, can include multiple optically active layers through which ambient light must pass through before reaching the ambient light sensor. Penetration of the ambient light through several layers can lead to reduced sensitivity and false or no ambient light detection. Further, one or more optical sensors can sometimes be unintentionally covered by a material, such as dirt or the user's shirt cuff, which can also lead to an erroneous detection (or lack of detection) of ambient light.

In some examples of the disclosure, the one or more optical sensors can be placed at locations on the portable electronic device such that the usability and aesthetic appeal of the portable electronic device are not negatively impacted. For example, one or more optical sensors can be placed on the underside of the portable electronic device instead of on the top surface in the border region. Placing the optical sensors on the underside of the device can minimize its surface area, thereby leading to smaller, less bulky devices. Furthermore, the placement of the optical sensors can be hidden from the user's view, leading to more attractive and aesthetically appealing devices. In some examples, the device can determine the ambient light conditions when the user substantially covers the portable electronic device, such as with a shirt cuff, without blocking one or more optical sensors, thereby enhancing the usability of the device. In some examples, the front side of the portable electronic device can provide protection against foreign objects, such as dirt, from covering or blocking the optical sensors. In some examples, the optical sensors can be placed on the side of the portable electronic device.

In addition to enhanced usability and aesthetic appeal, the one or more optical sensors can detect ambient light conditions and can extract information that can be increase the functionality of the portable electronic device. One or more optical sensors can be used to determine both the ambient light level and the type of ambient light. Based on the determined ambient light level and type of ambient light, the device can generate notifications to the user, can track the user's daily patterns, or can couple with one or more other sensors to generate additional information, for example.

Figure 3A:
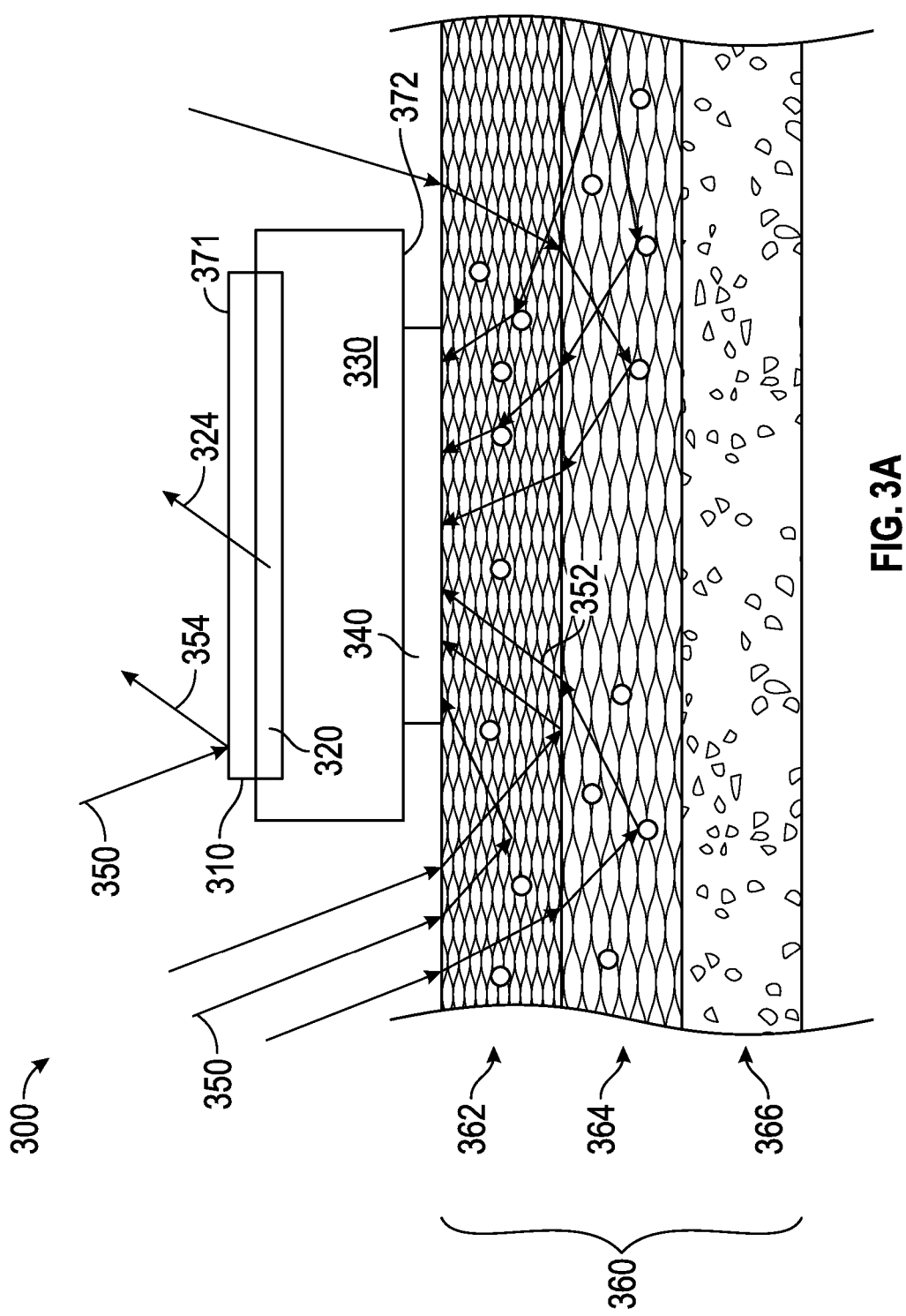
FIG. 3A illustrates a cross-sectional view of an exemplary portable electronic device with optical sensors located outside of the device body on the underside of the device.

FIG. 3A illustrates a cross-sectional view of an exemplary portable electronic device with optical sensors located outside of the device body on the underside of the device. Exemplary portable electronic device 300 can include a touch screen 310, a display 320, a device body 330, and an optical sensor 340. The device 300 can include a top surface 371, which can be, for example, the surface of the touch screen 310 located in the user's line of sight. The body 330 can include components such as microprocessor chips, printed circuit board chips, memory chips, batteries, indicators, and input mechanisms. Optical sensor 340 can be located on the underside 372 of the device facing a human body part. The human body, or more particularly, the skin and flesh of the human body can become an interface between incident light and the optical sensor. While FIG. 3A illustrates top surface 371 located on the surface of the touch screen, top surface 371 can include, and is not limited to, any surface along the same plane as the surface of the touch screen that may or may not detect a touch.

Portable electronic device 300 can be attached to, resting on, or touching a part of the user such that the underside 372 of the device faces a body part 360 of the user. For example, the device can be a wearable device attached to, resting on, or touching a user's wrist, torso, arm, leg, or forehead. Incident light 350 can interact with the user's body part 360. The human anatomy can allow the incident light 350 to enter through the skin 362 and flesh 364, and reflect back out towards the optical sensor 340. The optical sensor 340 can detect the reflected light 352. When the optical sensor 340 detects all or part of reflected light 352, a signal can be generated that is indicative of one or more characteristics of the reflected light 352. For example, the signal can be indicative of the intensity of reflected light 352 at one or more wavelengths, and/or can be indicative of the range of wavelengths included in the reflected light. The signal can be a voltage, a current, or any other signal that can convey information to the device. In some examples, the portable electronic device can include another semiconductor diode or electrical device, configured to convert the light detected by the optical sensor to a measurable current or voltage. In some examples, incident light can include ambient light. Ambient light can be characterized by an ambient light level based on the reflected light intensity, and can further be characterized by a type of ambient light based on environmental conditions. In some examples, incident light 350 can reflect off of the top surface 371 as reflected light 354. The reflected light 354 and the light generated from the display 324 can lead to a perceived difference in the contrast and color of an image projected by the display 320. While FIG. 3A illustrates a portable electronic device with a touch screen and a display as separate components, examples of the disclosure can include, and are not limited to, devices with integrated touch and display panels.

Optical sensor 340 can be a sensor that is sensitive to light incident impinging upon it. In some examples, the optical sensor may be an ambient light sensor configured to sense light within the visible spectrum. However, other examples may utilize other types of sensors. For example, sensor 340 can be sensitive to a wide range of wavelengths of light, or can be sensitive to a single wavelength or a narrow range of wavelengths. The optical sensor can sense visible light, infrared light, ultraviolet light, and/or other spectra of light, or can be any combination or portion of the above spectra. The optical sensor may be any type of sensor or sensors, including, but not limited to, a photoresistor, optical detector, chemical detector, photovoltaic cell, photodiode, phototransistor, charge-coupled device, and so on. In some examples, the optical sensor may be fully or partially exposed or packaged within a translucent or semi-translucent window.

The portable electronic device can include a controller configured to change the luminous output of the backlight based on a reading of the optical sensor. In some examples, the controller can be located in device body 330. The controller may be configured to change the amount of power the backlight draws from a power source or the light output from the display 320 based on the ambient light level sensed by the optical sensor. In some examples, the light output from the display can be changed based on the type of ambient light level sensed. In some examples, the controller may be configured to activate other optical sensors in the device based on the levels and/or type of ambient light sensed. In some examples, a processor can be located in the device body 330 and can utilize the detected information for performing a wide variety of tasks such as generating notifications or compensating outputs from other sensors.

Figure 3B:
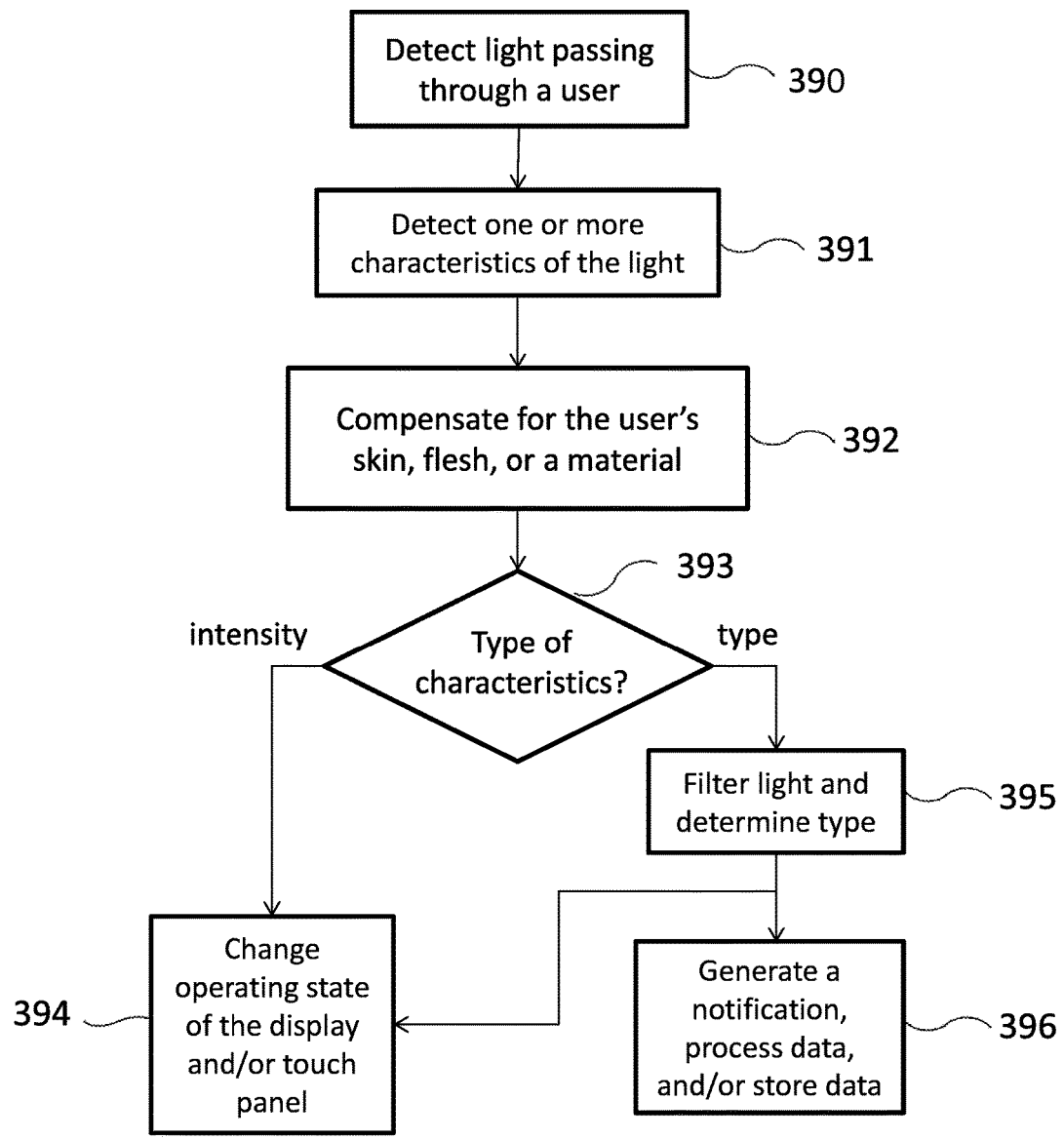
FIG. 3B illustrates a flow chart of an exemplary process flow for detecting light through a part of the user according to various examples of the disclosure.

FIG. 3B illustrates a flow chart of an exemplary process flow for detecting light through a part of the user according to various examples of the disclosure. At 390, one or more sensors located on the underside of the device can detect light passing through the user. At 391, the one or more characteristics of the light can be detected. At 392, the device can compensate for the user's skin, flesh, or a material located between the device and user. Compensation values can retrieved from a preset list of values or can be determined based on the one or more characteristics. At 394, the operating state of the display and/or touch panel may be changed based on characteristics determined in 393. Additionally or alternatively, at 395, the device can filter light and determine the type of light based on characteristics determined in 393. At 396, the device can generate a notification, process the data, and/or store the data. It is to be understood that various examples of the disclosure may or may not follow the order of the process flow illustrated in FIG. 3B and one or more of the steps may be optional. Furthermore, additional steps may be included and examples of the disclosure are not limited to the steps shown.

Figure 4:
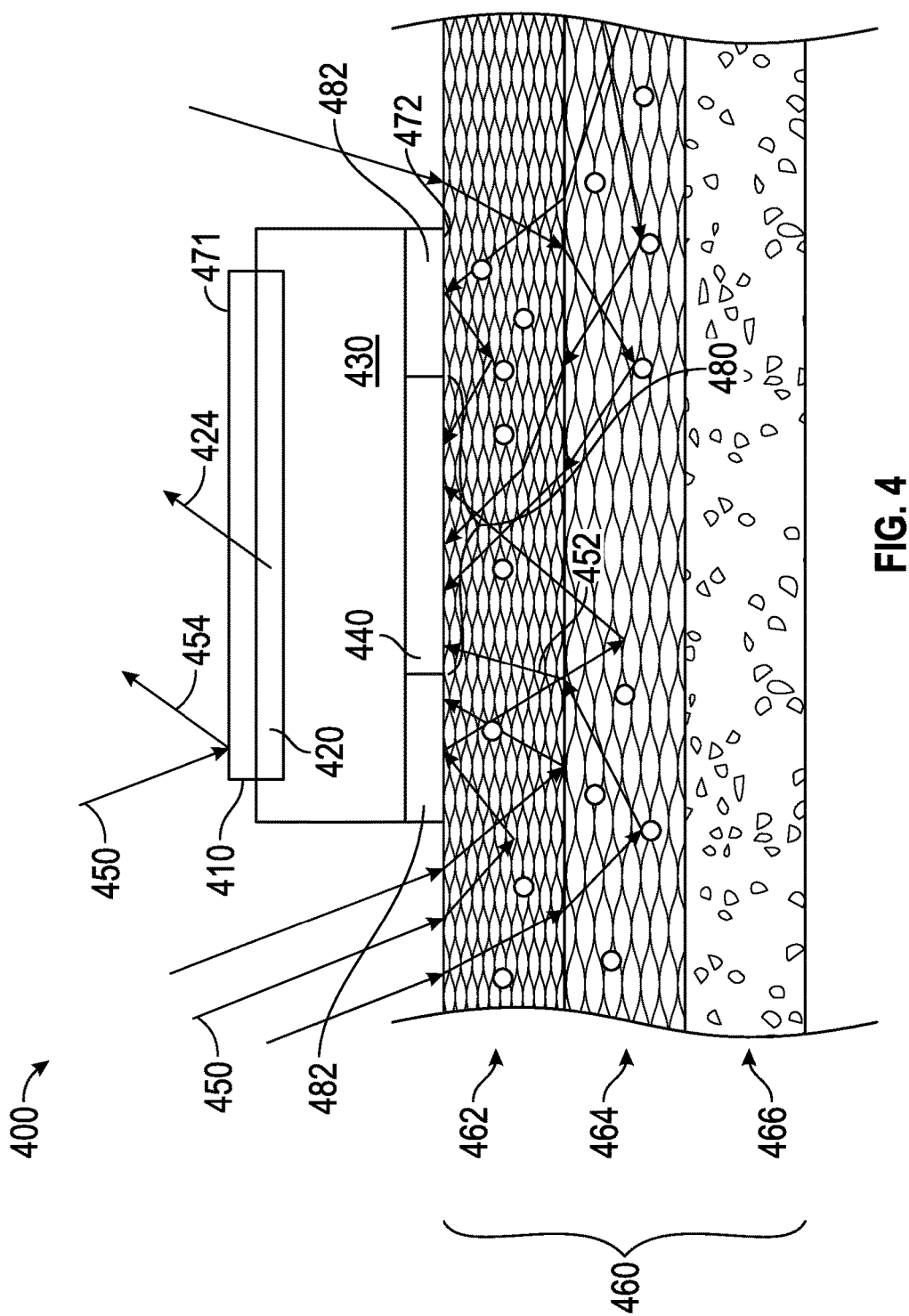
FIG. 4 illustrates a cross-sectional view of an exemplary portable electronic device with optical sensors located on the underside of the device.

FIG. 4 illustrates a cross-sectional view of an exemplary portable electronic device with optical sensors located on the underside of the device. Exemplary portable electronic device 400 can include a touch screen 410, a display 420, a device body 430, and an optical sensor 440. The device 400 can include a top 471, which can be, for example, the surface of the touch screen 410 located in the user's line of sight.

The body 430 can include components such as microprocessor chips, printed circuit board chips, memory chips, batteries, indicators, and input mechanisms. Optical sensor 440 can be located on the underside 472 of the device facing a human body. Incident light 450 can enter through the skin 462 and flesh 464 of the user's body part 460. Incident light can reflect back out towards the optical sensor 440, and the optical sensor can measure reflected light 452. The optical sensor 440 can be disposed near the surface of the underside 472 such that reflected light 452 does not have to pass through several optically active layers before reaching the optical sensor 440. Penetration of the reflected light through several layers can lead to reduced sensitivity and false light detection (or lack thereof). In some examples, incident light 450 can reflect off of the top surface 471 as reflected light 454. The reflected light 454 and the light generated from the display 424 can lead to a perceived difference in the contrast and color of an image projected by the display 420. In some examples, the device 430 can protect and prevent foreign objects, such as dirt, from covering or blocking reflected light or incident light from reaching the optical sensors, thereby preventing false readings.

Optical sensor 440 can measure reflected light 452 incident on it through opening 480. Opening 480 can be defined by barriers 482. Barriers 482 can be any region that can be substantially opaque, for example a metallic housing member or a light shield. Opening 480 can be any section of the underside 472 that can allow the transmission of reflected light through it, such that the reflected light can reach optical sensor 440. Opening 480 can be a section of underside 472 that includes structure and that can allow at least some light transmission through it, such as an optically transparent glass or plastic. It is understood that other structures that can allow at least some light transmission to sensor 440 can be suitable for use as opening 480. While FIG. 4 illustrates top surface 471 to be located on the surface of the touch screen, top surface 471 can include, and is not limited to, any surface along the same plane as the surface of the touch screen that may or may not detect a touch. Additionally, examples of the disclosure can include, and are not limited to, devices with integrated touch and display panels.

Figure 5:
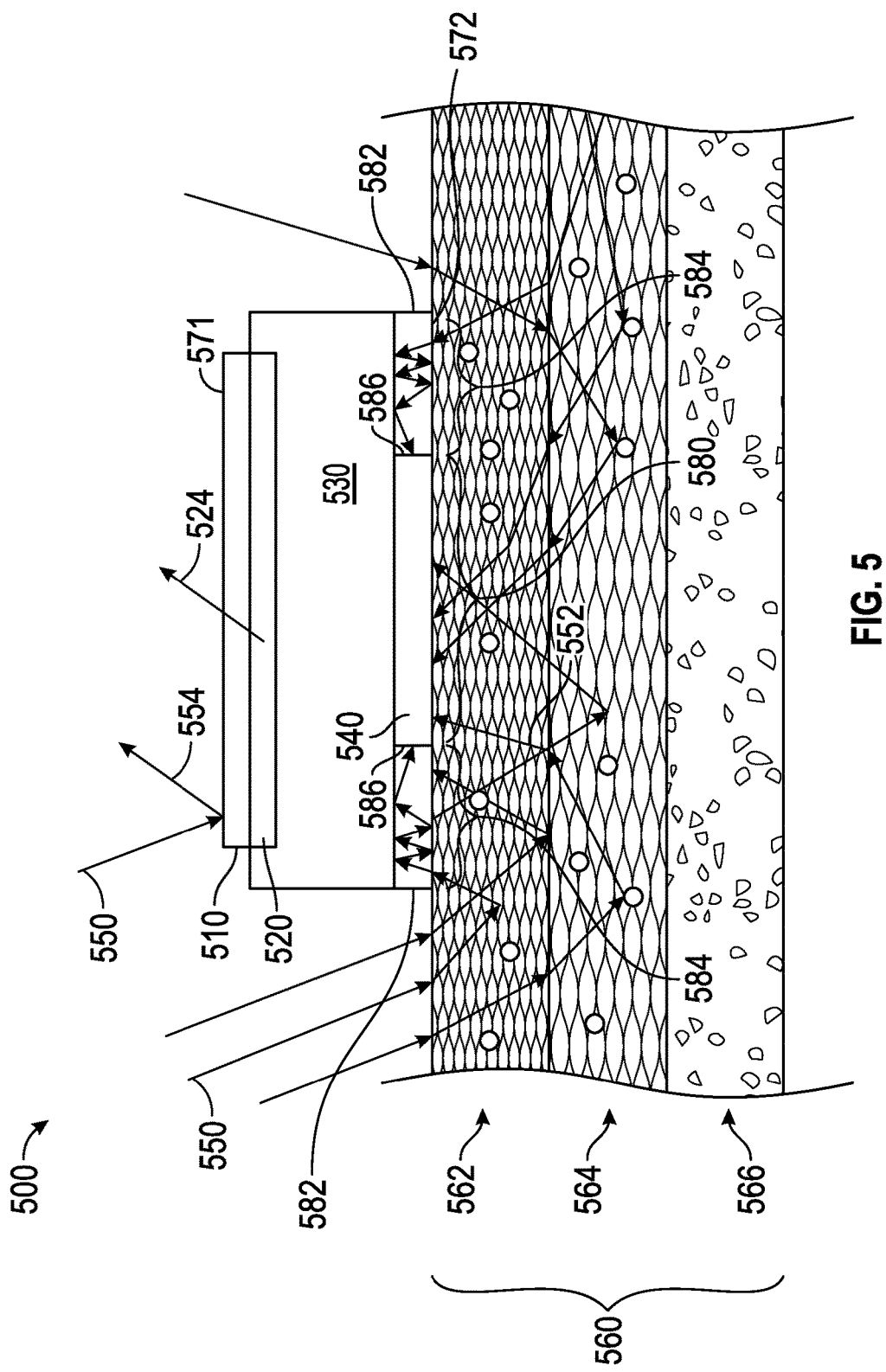
FIG. 5 illustrates a cross-sectional view of an exemplary portable electronic device with an optical sensor and light channels located on the underside of the device and facing a human body part.

FIG. 5 illustrates a cross-sectional view of an exemplary portable electronic device with an optical sensor and light channels located on the underside of the device facing the human body. Exemplary portable electronic device 500 can include a touch screen 510, a display 520, a device body 530, and an optical sensor 540. The device 500 can include a top surface 571, which can be, for example, the surface of the touch screen 510 located in the user's line of sight. The body 530 can include components such as microprocessor chips, printed circuit board chips, memory chips, batteries, indicators, and input mechanisms. Optical sensor 540 can be located on the underside 572 of the device facing a human body. Incident light 550 can enter through the skin 562 and flesh 564 of the user's body part 560. Incident light can reflect back out as reflected light 552 towards the optical sensor 540. Optical sensor 540 can measure reflected light 552 incident at opening 580. Light channels 584 can be disposed near optical sensor 540. Light channels 584 can be used to direct reflected light 552 incident at opening 584 to be detected by the optical sensor at the walls of the optical sensor 586. The light channels 584 can help increase the amount of detected reflected light and increase the intensity of the signal. In some examples, collecting optics, such as focusing lenses, reflectors, or fiber optics can be used to enhance the detection of ambient light. The collecting optics or light channels can be disposed in areas where passive components are located. In some examples, incident light 550 can reflect off of the top surface 571 as reflected light 554. The reflected light 554 and the light generated from the display 524 can lead to a perceived difference in the contrast and color of an image projected by the display 520.

Figure 6:
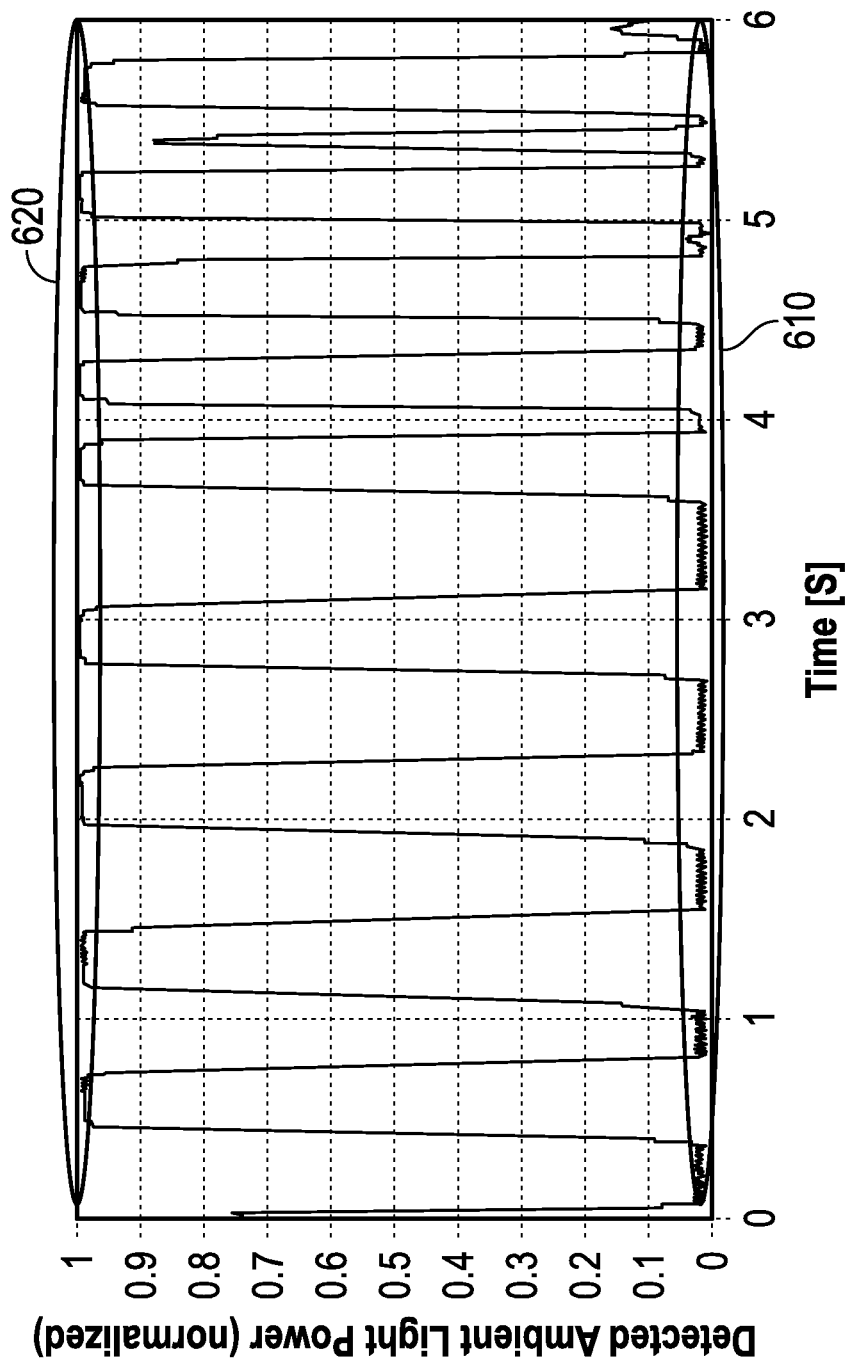
FIG. 6 illustrates a normalized output from an exemplary portable electronic device with an optical sensor mounted on the underside of the device and facing a human arm.

FIG. 6 illustrates a normalized output from an exemplary portable electronic device with an optical sensor mounted on the underside of the device facing a human arm. The portable electronic device and human arm were located in a room filled with ambient light. Over a time period of six (6) seconds, the ambient light was turned on and off, and the optical sensor was able to detect the absence of ambient, as indicated by arrow 610, and the presence of the ambient light, as indicated by arrow 620.

In addition to the capability of the optical sensor detecting the intensity of ambient light, the optical sensor can be configured to determine the type of ambient light based on its spectrum. The ambient light can originate from a natural source, such as the sun, or an artificial source, such as incandescent, fluorescent, LED, etc. A light source can have unique characteristics and the type of ambient light can be determined based on these characteristics.

Figure 7:
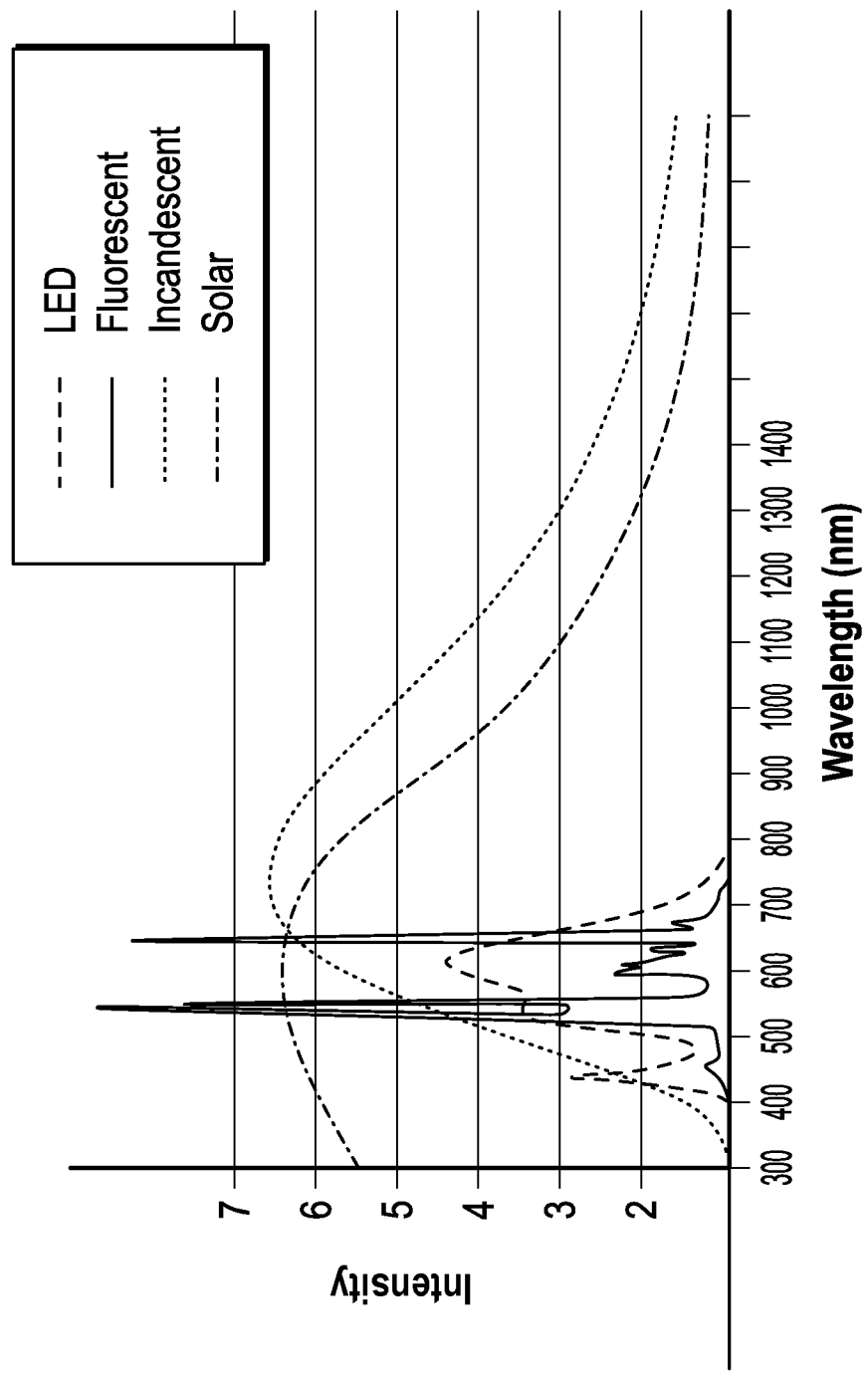
FIG. 7 illustrates the spectra of an LED light source, a fluorescent light source, an incandescent light source, and a solar light source.

FIG. 7 illustrates the spectra of an LED light source, a fluorescent light source, an incandescent light source, and a solar light source. Based on the spectra of a light source, the type of ambient light can be determined. The spectrum of an LED source, shown as a solid line, can emit very little power outside the visible spectrum. Thus, a spectrum with light detected in the visible and not in the infrared (IR) or ultraviolet (UV) spectra can be an indication of an LED light source. LEDs can also sometimes be modulated at a local alternating-current (AC) frequency, such as, for example, in the range of 50-60 Hz. The spectrum of a fluorescent light source, shown as a dashed line, can also emit very little power outside of the visible spectrum. However, fluorescent light can be distinguished by strong, narrow emission peaks in the visible spectrum. Additionally, fluorescent light can sometimes be modulated at twice a local AC frequency, such as, for example, in the range of 100-200 Hz. The spectrum of an incandescent light source, shown as a dotted line, can have a broad spectrum and can emit a considerable amount of power in the IR spectrum and can emit very little power in the UV spectrum. The spectrum of a solar light source, shown as a dashed-dotted line, can have a broad spectrum, including power in the infrared and UV spectra, and other radiation beyond those wavelengths. A solar light source can also include a considerable amount of power in the visible spectrum as compared to an incandescent light source.

One or more filters can be used to filter out or pass through certain frequencies. In some examples, the filters can be absorption filters, such as organic filters, which can allow certain frequencies of light to pass through while absorbing the other frequencies. In some examples, the filters can be other types of filters, such as interference filters, which can allow certain frequencies of light to pass through while reflecting the other frequencies. In some examples, a filter can be coupled to the optical sensor to pass through light detected at the wavelengths coinciding with the strong, narrow emission peaks of a fluorescent light source. Once the strong, narrow emission peaks are passed through and identified, the portable electronic device can determine that the user is inside in a classroom, for example, under fluorescent lighting. In some examples, the one or more filters may be a low pass filter, a high pass filter, a broadband filter, or a narrow pass filter. In some examples, the optical sensor may detect only a specific range of frequencies or may be a narrow band detector. In some examples, the optical sensors can detect the entire spectra, and certain wavelengths can be selected or filtered in software.

In some examples, the skin and/or flesh of the user can act as a filter of incident light passing through it. In some examples, the optical sensors can be tuned to compensate for the filtering or attenuation of light through the skin and flesh. In some examples, the compensation can be performed in software, which can adapt the optical sensor output for different skin filtering effects. In either hardware or software examples, the hardware or software can be dynamically tunable based on previously captured results or manual user input, or the hardware or software can be set to a single setting that can cover a wide range of skin types. In some examples, the software can be calibrated as an initial setting or can be adaptive software. In some examples, the calibration can include adjustments based on an article of clothing or a piece of material located between the user's skin and the underside of the device.

The color of an image projected by the display of a portable electronic device can be perceived based on the ambient light incident onto the display and reflecting off the surface of the display towards the user's eye. Therefore, the color seen by the user can be affected by the ambient light conditions. This can lead to the user unintentionally having a biased perception of the colors of an image on the display. In some examples, the colors of the display in the portable electronic device can be adjusted to compensate for the levels and type of detected ambient light. A process to correct the color can be performed by software to compensate for the biased perception of the colors. In some examples, the device can determine if the user is indoors or outdoors based on the type of detected ambient light. The device can store preset values for the color balance. The preset values for color balance or color temperature can be associated with the type of detected ambient light, and the display can adjust the color of the projected images based on the preset values. In some examples, the color balance or color temperature of a captured image, such as an image taken from a camera located on or interfacing with the device, can be adjusted based on the detected ambient light levels and the type of ambient light.

Figure 8C:
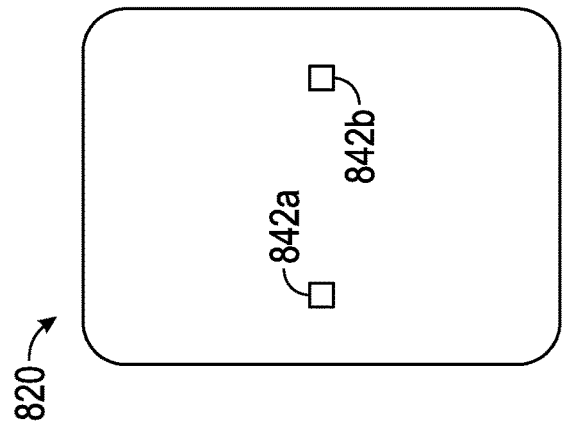
FIG. 8C illustrates a view of the underside of an exemplary portable electronic device with multiple optical sensors.
Figure 8B:
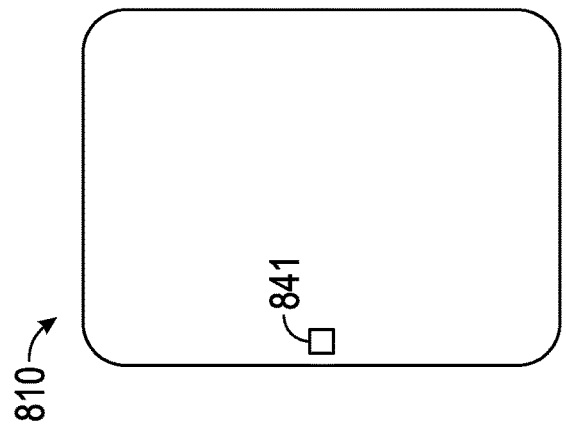
FIG. 8B illustrates a view of the underside of an exemplary portable electronic device with an optical sensor located on one side.
Figure 8A:
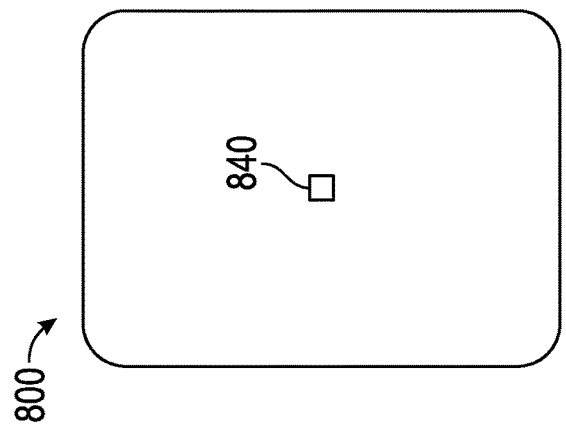
FIG. 8A illustrates a view of the underside of an exemplary portable electronic device with an optical sensor located in the center.

FIG. 8A illustrates a view of the underside of an exemplary portable electronic device 800 with an optical sensor 840 located in the center. FIG. 8B illustrates a view of the underside of an exemplary portable electronic device 810 with an optical sensor 840 located on one side. In some examples, the location of the optical sensor can be determined based on the orientation of the portable electronic device when attached to, resting on, or touching the user. The optical sensors can be disposed in any location on the underside of the device, such as the right side, top, or bottom, and is not limited to configurations as shown in FIGS. 8A-8B.

FIG. 8C illustrates a view of the underside of an exemplary portable electronic device 820 with multiple optical sensors. Multiple optical sensors 842a and 824b can be used for a more accurate detection of ambient light. While FIG. 8C illustrates two optical sensors, the examples of the disclosure can include, and are not limited to, more than two optical sensors. In some examples, data from the multiple optical sensors can be averaged. In some examples, the device may selectively choose data from one or more optical sensor based on the most accurate representation of the ambient lighting conditions for the device, such as in situations when one or more sensors may shadowed due to the presence of an external object. In some examples, the device can discard low light signal readings or readings that appear to be erroneous. In some examples, one or more optical sensors can be used to calibrate another optical sensor.

Figure 8E:
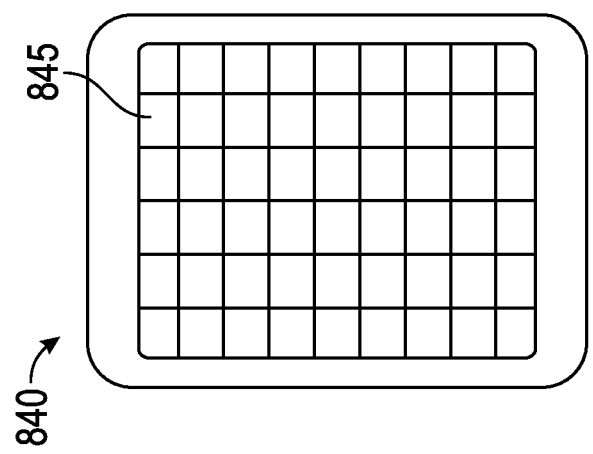
FIG. 8E illustrates a view of the underside of an exemplary portable electronic device with an array of optical sensors.
Figure 8D:
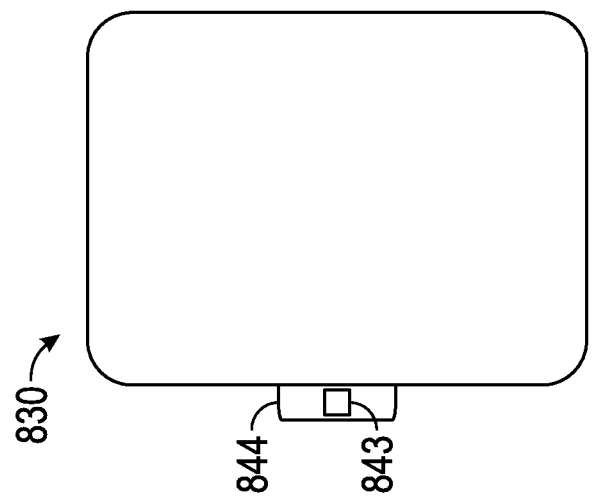
FIG. 8D illustrates a view of the underside of an exemplary portable electronic device with an optical sensor located on an external component of the device.

FIG. 8D illustrates a view of the underside of an exemplary portable electronic device with an optical sensor located on an external component of the device. Device 830 can include an optical sensor 843 integrated into the underside of an external component 844, such as a button. In some examples, the external component can include a rotary knob that can be turned to face the user's body skin and flesh or can be turned to be aligned with the user's line of sight.

FIG. 8E illustrates a view of the underside of an exemplary portable electronic device 840 with an array of optical sensors 845. Due to the majority of components, such as the touch screen, directly interfacing with the user through the top surface and not the underside, the underside of the device can include an array of optical sensors instead of just one or two optical sensors. The array of optical sensors would not interfere with any other components and an accurate reading could be achieved. In some examples, the optical sensors may be arranged in a checkerboard pattern. In some examples, two types of sensors can be used and each type of sensor can have alternating positions. In some examples, the types of sensors or filters can be coupled to channels. The channels can be designated based on the filtered wavelength range. Detected signals from one designated channel, such as an IR channel, can be used to divide or subtract out detected signals from another designated channel, such as a UV channel. The resultant division or subtraction can lead to a signal in the UV that can be used to adjust or compensate the image projected on the display. In some examples, sensors of the same type can be connected together. While FIG. 8E illustrates the optical sensors arranged in a checkerboard pattern, it is to be understood that any number of sensor types, and any arrangement of sensors can be employed.

In some examples, the sensors can be spread around in the array, and the detected light amongst the sensors can be averaged to minimize the effects of uneven light distribution. In some examples, the device may determine which optical sensor most accurately represents the ambient lighting conditions for the device, such as when sensors are shadowed due to the presence of an external object. In some examples, the device can discard low light signal readings or readings that appear to be erroneous. In some examples, one or more optical sensors can be used to calibrate another optical sensor. In some examples, one or more optical sensors can be powered down or placed in a standby state depending on the application. In some examples, a single filter can be used for all optical sensors to filter out specific wavelengths or types of light. In some examples, each optical sensor in the array can be coupled to its own filter.

In some examples, the adjustment of backlight intensity and/or color balance can be based on the location of the one or more optical sensors on the underside of the device. The adjustment can take into account, for example, any shadowing effects of the device body. In some examples, the adjustment can be based on the amount of skin or flesh the ambient light travels through before reaching the one or more optical sensors. For example, an optical sensor located near the center of the underside of the device can have a weak light intensity and blue wavelengths can be more attenuated due to the light having passed through a greater amount of skin and flesh. The device can adjust for this greater amount of attenuation in either hardware, software, or both. In some examples, the spectrum of the ambient light can be detected using one or more secondary sensors disposed on the top surface. The spectrum can be coupled to the intensity of ambient light measured using one or more primary sensors disposed on the underside of the device.

Figure 9A:
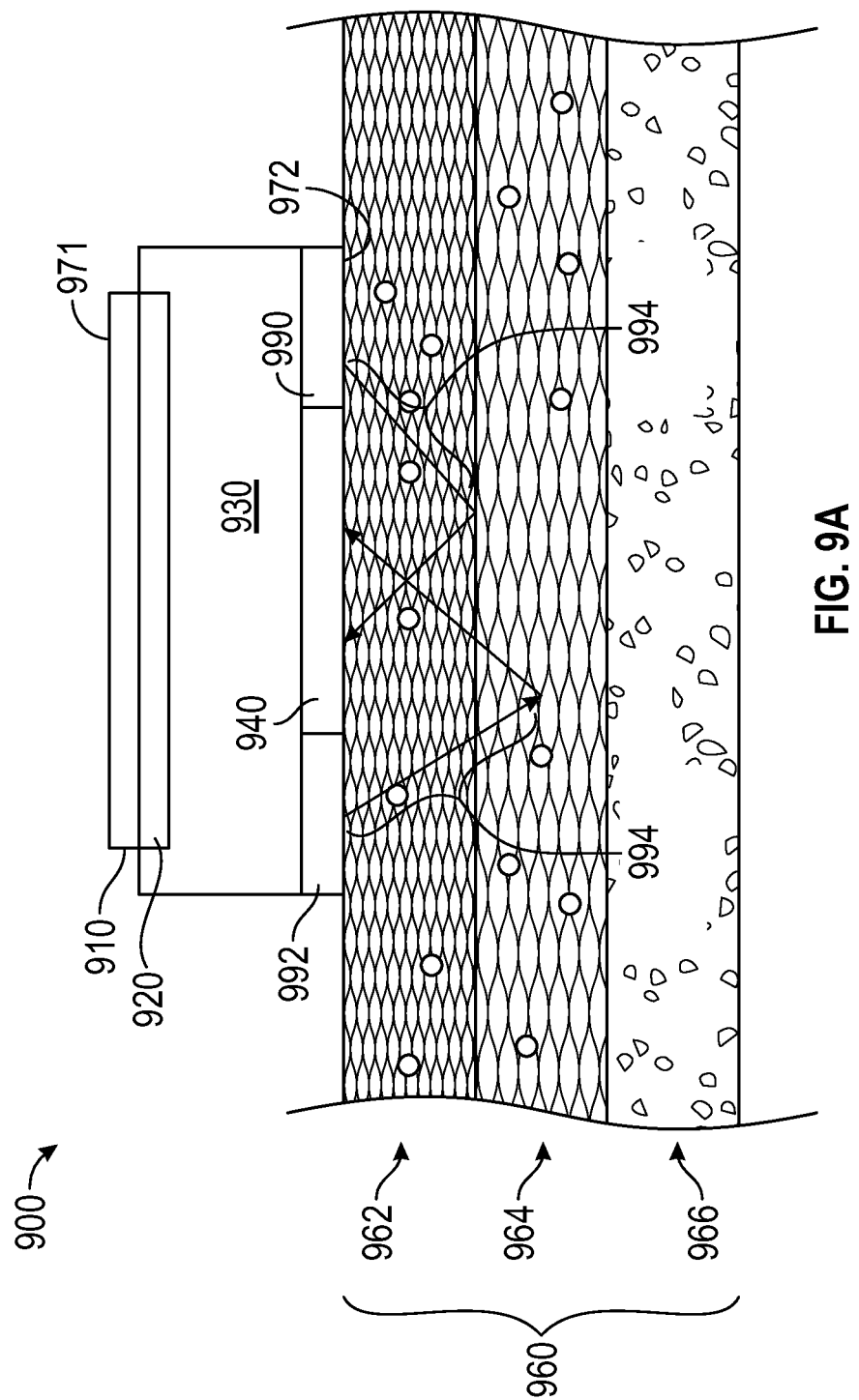
FIG. 9A illustrates a cross-sectional view of an exemplary portable electronic device with optical sensors located outside of the device body on the underside of the device.
Figure 9B:
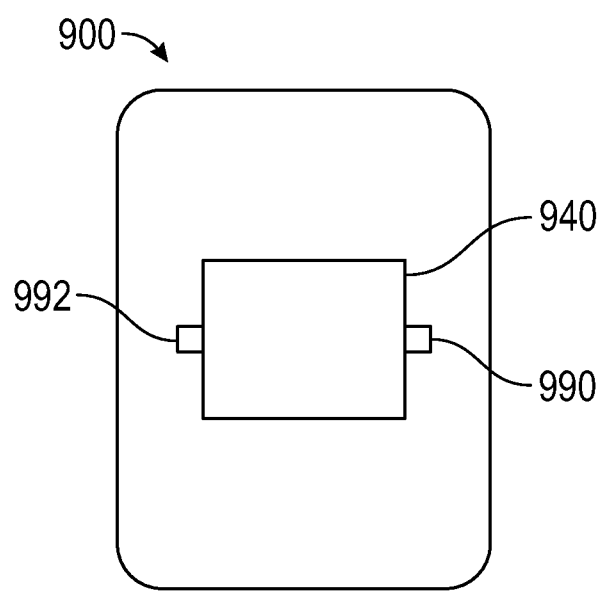
FIG. 9B illustrates a view of the underside of an exemplary portable electronic device with an optical sensor and light sources.

In some examples, the device can include one or more light sensors for purposes, such as calibration. FIG. 9A illustrates a cross-sectional view and FIG. 9B illustrates a view of the underside of an exemplary portable electronic device with an optical sensor and light sources located on the underside of the device facing the human body. Exemplary portable electronic device 900 can include a touch screen 910, a display 920, a device body 930, an optical sensor 940, and light sources 990 and 992. The device 900 can include a top surface 971, which can be, for example, the surface of the touch screen 910 located in the user's line of sight. The device body 930 can include components such as microprocessor chips, printed circuit board chips, memory chips, batteries, indicators, and input mechanisms. Optical sensor 940 and light sources 990 and 992 can be located on the underside 972 of the device facing a human body. The light sources 990 and 992 can be any type of light source, such as LED or fluorescent, directed towards the body part 960. In some examples, the device 990 can include one or more of the light sources 990 that can be one type of light source, while one or more of the light sources 992 can be another type of light source. In some examples, light sources 990 and 992 can be the same type of light source, but emitting at different wavelengths. One or more light rays 994 emitted from light sources 990 and 992 can enter through the skin 962 and flesh 964 of the user's body part 960, and reflect back towards the optical sensor 940. The device 900 can adjust the backlight intensity and/or color balance based on the change in properties of the light rays 994 due to passing through the skin 962 and flesh 964 and reflected back to the optical sensor 940. In some examples, the device 900 can take into account the distances between the light sources 990 and 992 and the optical sensor 940. In some examples, the device 900 can store the change in properties as calibration values for future adjustments or for historical tracking. In some examples, the device 900 can turn on light source 990 at a time different from turning on light source 992. Optical sensor 940 can detect lights rays 994 from both light sources and adjust accordingly. In some examples, the device 900 can compare the light rays 994 detected by optical sensor 940 in the absence of ambient light to light rays detected by ambient light, such as reflected light 552 shown in FIG. 5A. In some examples, device 900 can include multiple light sources, such as light sources 990 and 992, and one or more optical sensors, such as optical sensor 940, for a more accurate calibration and/or detection of ambient light. Accurate calibration can be useful in situations, for example, when the spectrum may be broad such as natural sunlight hitting the user's skin.

Due to the ambient light passing through the user's skin, the intensity of the ambient light can be reduced. To boost the intensity of the signal, circuitry, such as amplifiers, can be used. In some examples, the optical sensor signal can be amplified and converted to a digital signal using a digitizer in an analog front end. The gain of the amplifiers or the gain stage can be dynamically adjusted based on the amount of light that is detected or the amount of lux, or based on the amount of desired resolution or precision. In some examples, the analog front end can detect if the signal level is saturating and can lower the gain level in response to the saturation. In some examples, the gain can be adjusted by a microprocessor located in the device, in response to an interrupt that is generated when the signal level is too low or too high. In some examples, optical sensors, circuitry, and an optional processor can be located within a single integrated circuit. In some examples, the intensity can be boosted in software. In some examples, the detected ambient light values can be compensated to incorporate different skin filtering effects, as discussed above. Adjustments or compensation can be performed in either hardware or software. In either hardware or software examples, the hardware or software can be dynamically tunable based on previously captured results or manual user input. In some examples, hardware or software can be preprogrammed or the device calibrated by the user for a single setting that can cover the widest range of skin types. In some examples, the device can be calibrated to situations when the wearable device is worn over a material, such as an arm sleeve, where ambient light penetrates through the material and reflects back to the underside of the device.

As stated above, the devices of the disclosure can be exposed to different ambient light environments and conditions. In some examples, the portable electronic device can be indoors, such as in an office, at school, or at home, and can sense ambient light from an LED, fluorescent, or incandescent light source. In some examples, the device can be outdoors, and can sense ambient light from the sun. In order to provide a viewer with an acceptable viewing experience, the viewable image presented on the display should appear bright and not washed out under all ambient light conditions. For example, in a brightly lit situation, the overall contrast between the displayed image and the surrounding area can be reduced, and the image presented on the display can appear washed out. In some examples, a display can attempt to maintain an acceptable viewing experience by using an optical sensor to detect the ambient light level and type. Based on the detected ambient light level and type, the backlight intensity and/or display color properties can be adjusted to provide the user with a more acceptable viewing experience. In some examples, the optical sensors can mimic the human eye response by subtracting out ambient light levels for an optimal viewing experience. In some examples, the subtraction can include ultraviolet light, infrared light, or any light not visible to the human eye.

In some examples, a combination of optical sensors or a combination of filters can be used to distinguish between two or more different light sources whose spectra may be similar. For example, one optical sensor can be sensitive in the visible spectrum, and one optical sensor can be sensitive only to UV radiation. The two detected spectra can be added, subtracted, multiplied, divided, or a combination of those. From the resultant spectra, the device can determine the type of ambient light, and can infer on the environmental conditions that the user is experiencing. In another example, one optical sensor can be sensitive to light at one or more specific wavelengths, and the device can determine the type of ambient light based on the detection at these specific wavelengths. For example, the device can detect ambient light around 1400 nm wavelength and can also detect UV light. Due to the water vapor absorption in the Earth's atmosphere, solar radiation coming from the sun does not emit energy at or around 1400 nm or other water absorption bands. As a result, the device can determine that the UV ambient light can originate from an artificial UV source, such as an incandescent light bulb, a tanning bed, or a black light. In some examples, a narrow band optical sensor or filter can be coupled to another optical sensor or filter that can detect light in another wavelength range. In some examples, the device can determine the type of light source based on whether the light is modulated. For example, if the ambient light is modulated in the visible, then the device can determine that the ambient light originated from an LED or fluorescent light source. In some examples, the device can determine the environmental conditions based on the spectral characteristics from one spectrum. For example, the user can be located outdoors and exposed to natural sunlight. The optical sensor can capture the spectrum of the sunlight, and the device can compare the spectral power in the visible to the spectral power in the IR. If there is an insignificant difference in spectral power in the visible compared to the IR, the device can determine that the sky is cloudy.

In addition to adjusting the backlight intensity and the display color properties, the device can generate a notification to the user or can store the detected ambient light information in memory for future processing. In some examples, the device can warn the user of harmful exposure to UV sunlight. The device can differentiate between different levels of UV exposure, such as UVA, UVB, and UVC. The device can utilize the determined UV exposure level along with monitoring the amount of time and/or the time of day to generate a notification to the user. In some examples, the amount of time can be stored in memory and can be cumulative over several days, weeks, or months. In some examples, the notification can include a dialog on the display, an auditory notification, or the device can include a haptic feedback mechanism. In some examples, the device can track the amount of time the user is spending indoors during daytime and can generate a notification to the user to motivate the user to get outside and exercise. In one or more examples of the disclosure, the generated notification or stored ambient light information can include information from one or more sensors located on the top surface of the device, the underside of the device, the side of the device, or any combination.

In some examples, the ambient light detected through the optical sensors can be used for components other than the display. In some examples, the raw optical sensor data can be passed to other applications for their use. In some examples, raw optical sensor data can be compensated before or after it is sent to the other applications or components. In some examples, detected ambient light data can be combined with data from other sensors or sources, to perform various functions or to detect various conditions. In some examples, detected ambient light data from the optical sensors located on the underside of the device can be used to subtract out or compensate for unwanted ambient light sensed from other sensors. Other sensors and other data sources can include, but are not limited to, calendar information (e.g. date, time, meeting, events, appoints, etc.), weather information, location information (e.g., GPS), movement information (e.g., from an inertial sensor), biometric information, battery level information, and any other information that might be relevant to the device's determination. For example, if the device is wearable, the device can determine whether a user is sleeping based on the lack of ambient light along with information from other sensors, such as inertial sensors. If the user is sleeping, the device can adjust its mode of operation to conserve battery power (e.g., the device can turn off its touch screen and its processor).

Figure 10:
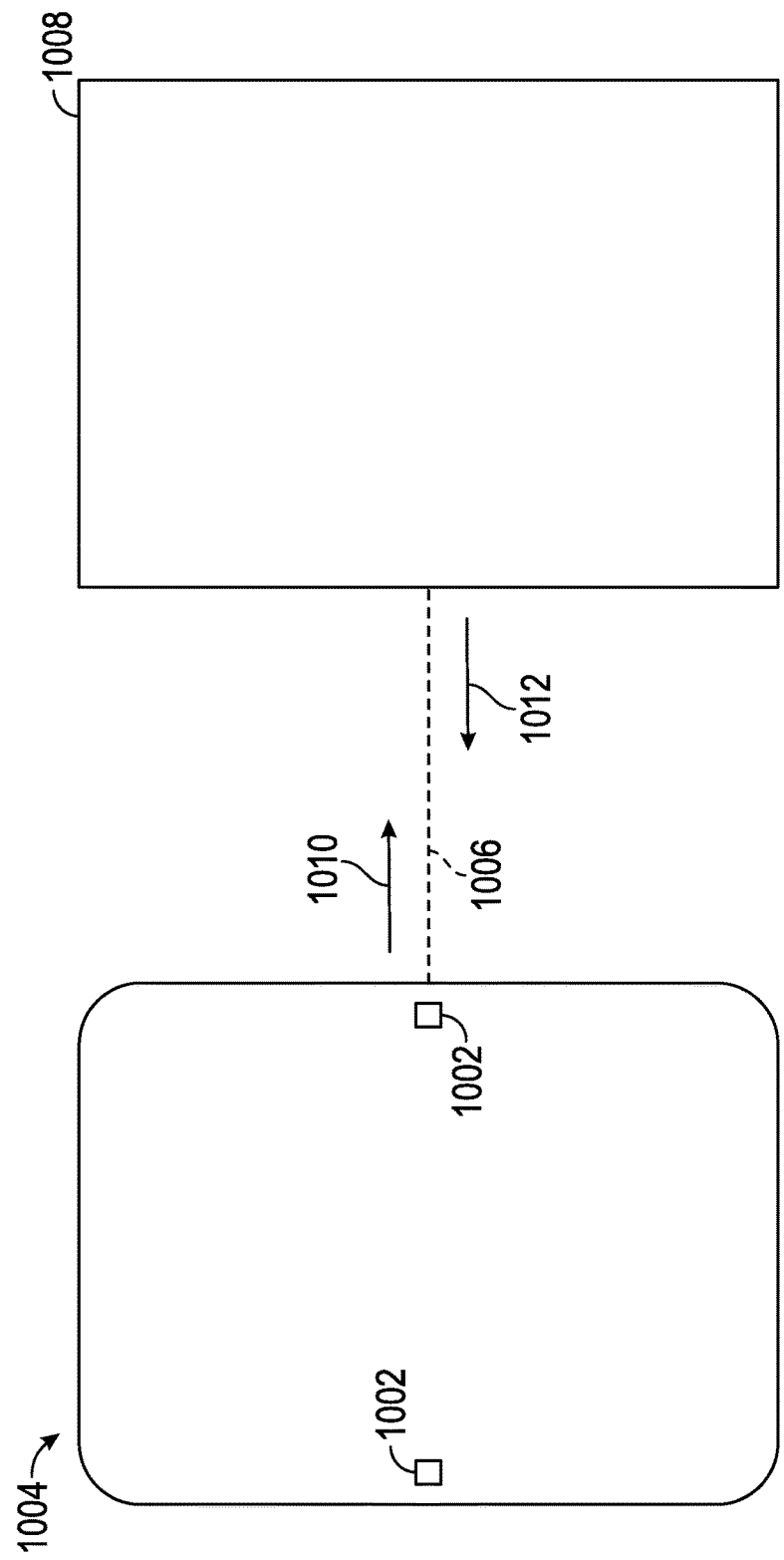
FIG. 10 illustrates an exemplary configuration in which an exemplary portable electronic device is connected to a host capable of processing of optical sensor outputs.

In some examples, the optical sensors described above can be included in the actual device of the disclosure, and processing of the sensor outputs can be performed on the device as well. However, in some examples, the processing of outputs from the optical sensors need not be performed on the device itself. FIG. 10 illustrates an exemplary configuration in which device 1004 is connected to host 1008, which performs processing of sensor outputs 1010. Device 1004 can include optical sensors 1002, and can be connected to host 1008 via connection 1006. Device 1004 can include a communication interface to which connection 1006 can be connected. Host 1008 can be any device external to device 1004. For example, if device 1004 is a mobile telephone, host 1008 can be a computer; if device 1004 is a wearable device, host 1008 can be a mobile telephone. Device 1004 and host 1008 need not be different types of devices; both can be mobile telephones, for example.

Connection 1006 can be any communication link that is suitable for communication between device 1004 and host 1008. For example, connection 1006 can be a connection over a physical cable that can be connected between device 1004 and host 1008. The physical cable can be based on, for example, standards such as Universal Serial Bus (USB), FireWire, Thunderbolt, or any other format for communication over a cable. Alternatively, connection 1006 can be any wireless connection between device 1004 and host 1008. The wireless communication can be based on standards such as Wi-Fi, Bluetooth, infrared, or any other format for wireless communication.

In operation, instead of processing the outputs from optical sensors 1002 itself, device 1004 can send optical sensor outputs 1010 to host 1008 for processing. In turn, host 1008 can process sensor outputs 1010, can determine, based on the optical sensor outputs, the intensity and type of ambient light, and can send processed result or a generated notifications 1012 back to the device. Based on processed result 1012, device 1004 can adjust its operation accordingly or device 1004 can alert the user of the generated notification. By offloading the processing of the outputs from output sensors 1002, device 1004 can conserve space or power and can increase the functionality of the device 1004. Such processing offloading can also enable device 1004 to remain small and portable, as space that could otherwise be required for processing logic can be freed up on the device.

Figure 11:
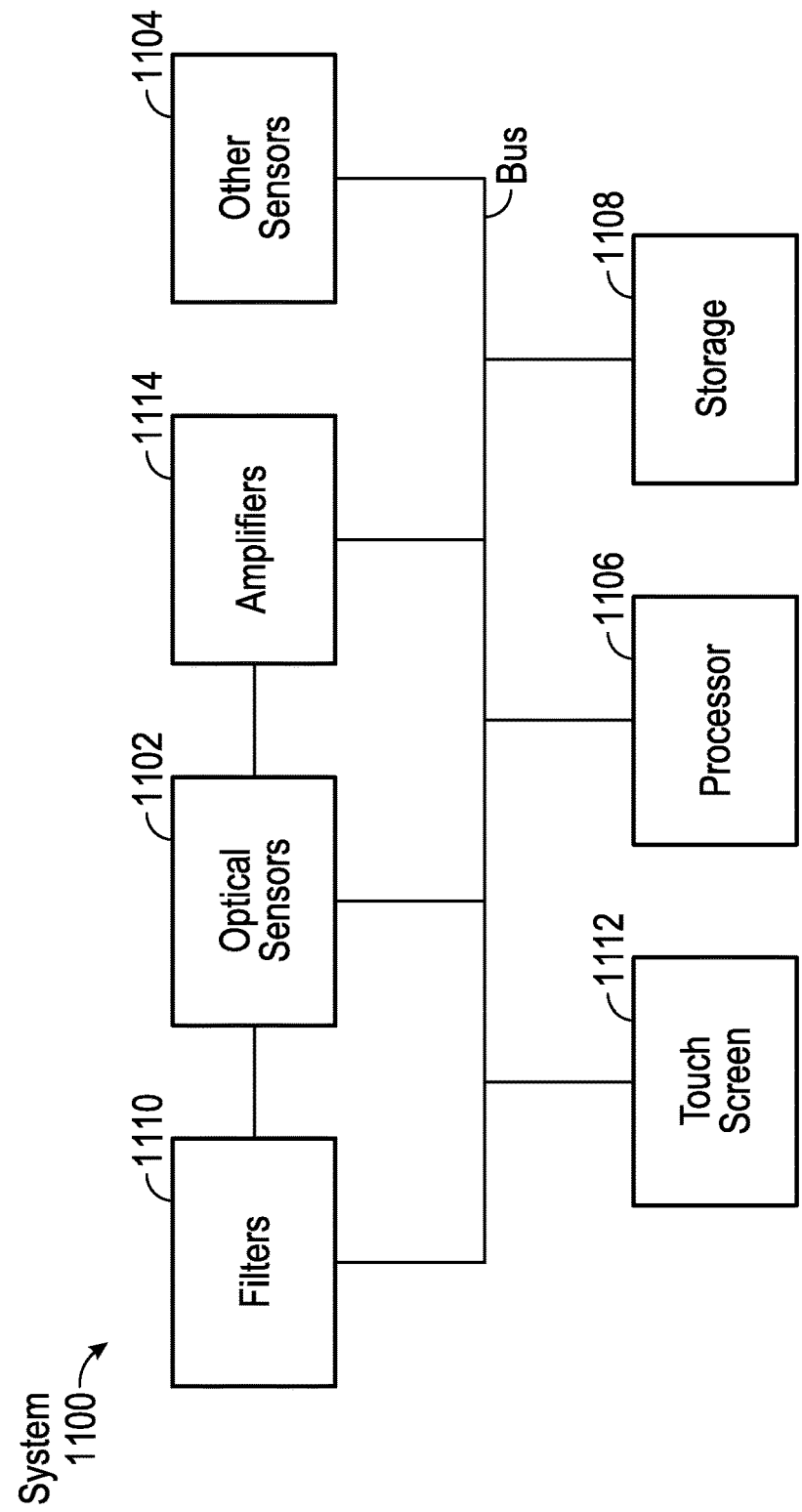
FIG. 11 illustrates an exemplary system according to examples of the disclosure.

FIG. 11 illustrates an exemplary system 1100 according to examples of the disclosure. System 1100 can include touch screen 1112, one or more processors 1106 and storage 1108. System 1100 can also include one or more optical sensors 1102 for ambient light detection, and other sensors 1104, such as those described above. Other sensors 1104 can also include other sources of information, as described above. Optical sensors 1102 can be coupled directly or indirectly to filters 1110 and/or amplifiers 1114. All of the above can be communicatively coupled via bus 1110.

Optical sensors 1102 can be amplified through amplifiers 1114, filtered through filters 1110, or its raw data can be output to processor 1106 for processing via bus 1110. Other sensors 1104, if included in system 1100, can also output sensor outputs to processor 1106 for processing via bus 1110. Touch screen 1112 can be the touch screen on the device according to examples of this disclosure. Storage 1108 can be any non-transitory computer-readable storage medium, and can store, for example, history and/or pattern data relating to measurements from the optical sensors 1102 and other sensors 1104. Storage 1108 can also store instructions that can cause processor 1106 to perform filtering, compensating, or boosting of detected ambient light, as described in the disclosure. Processor 1106 can adjust the device's operation based on the detected ambient light, as described in the disclosure. As a further example, if the device is a wearable device, the device can have enhanced functionality when coupling the detected ambient light information with additional sensors such as inertial sensors, biometric sensors, or other sensors, and additional information such as calendar information, weather information, and stored ambient light conditions history.

The various components of system 1100 can all be on a single device or can be distributed amongst multiple devices. For example, optical sensors 1102 and touch screen 1112 can be on a mobile telephone, and other sensors 1104, processor 1106, and storage 1108 can be on a host device, as described with reference to FIG. 11. Regardless of whether processor 1106 for processing sensor outputs is on a host, the device (e.g. the mobile telephone) can still include sufficient logic to adjust the operating states of its various components (e.g. the touch screen), based on the results of the processing done by the host. Relatedly, bus 1110 can be a physical bus line, a wireless connection, or any combination of the two (i.e., portions of bus line can be physical bus lines while other portions can be wireless connections). Bus 1110 merely denotes the ability of the various components of system 1100 to communicate with each other, if needed, via any suitable communication link.

For example, in the example above, bus 1110 between optical sensors 1102 and touch screen 1112 can be a physical bus line because the optical sensors and the touch screen can be on the same device. Similarly, bus 1110 between processor 1106, storage 1108, and other sensors 1104 can also be a physical bus line because those components can be on the same host. However, the connection between the two physical bus line segments can be a wireless connection, to allow for the device to communicate with the host.

Note that one or more of the functions described above can be performed, for example, by firmware stored in memory (e.g. storage 1108) and executed by processor 1106. The firmware can also be stored and/or transported within any non-transitory computer-readable storage medium (not including signals) for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as a CD, CD-R, CD-RW, DVD, DVD-R, or DVD-RW, or flash memory such as compact flash cards, secured digital cards, USB memory devices, memory sticks and the like.

In some examples, a device may be disclosed. The device may comprise: one or more optical sensors configured to detect light passing through a user; and logic coupled to the one or more sensors, the logic configured to detect one or more characteristics of the detected light and change an operating state of the device based on the one or more characteristics. Additionally or alternatively to one or more of the examples described above, the device further comprises a first surface supporting the one or more optical sensors and configured for being placed against the user's skin. Additionally or alternatively to one or more of the examples described above, the device further comprises a second surface opposite the first surface; and one or more optical sensors located on the first surface. Additionally or alternatively to one or more of the examples described above, the logic is further configured to compensate for the user's skin and flesh. Additionally or alternatively to one or more of the examples described above, the device further comprises one or more light sources, wherein at least one of the one or more optical sensors is configured to detect light generated from at least one of the one or more light sources passing through the user. Additionally or alternatively to one or more of the examples described above, the logic is configured to compensate for a distance between at least one of the one or more light sources and at least one of the one or more optical sensors. Additionally or alternatively to one or more of the examples described above, the one or more sensors comprise one or more ambient light sensors (ALS). Additionally or alternatively to one or more of the examples described above, detecting the one or more characteristics comprises detecting one or more wavelengths of the detected light, and wherein the logic is further configured for determining a type based on the one or more wavelengths of the detected light. Additionally or alternatively to one or more of the examples described above, each sensor is coupled to a channel based on the detected wavelength of the sensor. Additionally or alternatively to one or more of the examples described above, the device further comprises a display integrated with the device, wherein changing the operating state of the device comprises changing an operating state of the display. Additionally or alternatively to one or more of the examples described above, detecting the one or more characteristics comprises detecting an intensity of light, and changing the operating state of the display comprises changing a brightness of at least a portion of the display based on the detected intensity. Additionally or alternatively to one or more of the examples described above, the device further comprises a touch panel integrated with the device, wherein changing the operating state of the device comprises changing an operating state of the touch panel. Additionally or alternatively to one or more of the examples described above, at least one of the optical sensors is located on an external component of the device. Additionally or alternatively to one or more of the examples described above, the device further comprises one or more filters coupled to the one or more sensors. Additionally or alternatively to one or more of the examples described above, the device further comprises one or more of light channels, collecting optics, and reflective surfaces configured for directing the detected light.

In some examples, a device may be disclosed. The device may comprise: one or more sensors configured to detect light passing through a user; a communication interface coupled to the one or more sensors, the communication interface configured to send one or more outputs from the one or more sensors to an external device; and logic coupled to the communication interface, the logic configured to change an operating state of the device based on the one or more characteristics.

In some examples, a method of an electronic device including a plurality of optical sensors may be disclosed. The method may comprise: detecting light passing through a user from one or more of the plurality of optical sensors; detecting one or more characteristics of the detected light; and changing an operating state of the electronic device based on the one or more characteristics. Additionally or alternatively to one or more of the examples described above, the electric device further includes one or more light sources, the method further comprising: generating the detected light from the one or more light sources. Additionally or alternatively to one or more of the examples described above, the one or more characteristics includes an intensity of light and changing the operating state of the electronic device comprises changing an operating state of a display. Additionally or alternatively to one or more of the examples described above, changing the operating state of the electronic device comprises changing a brightness of at least a portion of the display based on the intensity of light. Additionally or alternatively to one or more of the examples described above, changing the operating state of the electronic device comprises changing an operating state of a touch panel. Additionally or alternatively to one or more of the examples described above, the one or more characteristics includes a type of light. Additionally or alternatively to one or more of the examples described above, the method further comprises: filtering the detected light at one or more wavelengths; and determining the type of light from the filtered detected light. Additionally or alternatively to one or more of the examples described above, the method further comprises: determining a modulation characteristics of the detected light; and determining the type of light from the modulation characteristics. Additionally or alternatively to one or more of the examples described above, the method further comprises: generating a notification in response to the type of light. Additionally or alternatively to one or more of the examples described above, changing the operating state of the electronic device comprises selecting preset color values based on the type of light and compensating at least a portion of a display with the preset color values.

In some examples, a non-transitory computer readable medium may be disclosed. The computer readable medium containing instructions that, when executed, perform a method of an electronic device including a plurality of optical sensors, the method comprising: detecting light passing through a user from one or more of the plurality of optical sensors; detecting one or more characteristics of the detected light; and changing an operating state of the electronic device based on the one or more characteristics. Additionally or alternatively to one or more of the examples described above, the method further comprises: filtering the detected light at one or more wavelengths; and determining a type of light from the filtered detected light. Additionally or alternatively to one or more of the examples described above, the method further comprises: determining a modulation characteristics of the detected light; and determining a type of light from the modulation characteristics.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A watch comprising:
a display located on a first surface of the watch;
one or more optical sensors located on a second surface, opposite the first surface, of the device and configured to detect a reflection of ambient light, from a source external to the watch, that has passed through a user; and
logic coupled to the one or more optical sensors, the logic configured to:
generate one or more signals based on the detected reflection of ambient light, and
change an operating state of the display based on the one or more signals.

2. The watch of claim 1, wherein the logic is further configured to compensate the one or more signals using one or more pre-determined compensation values, the one or more pre-determined compensation values associated with the user's skin and flesh.

3. The watch of claim 1, further comprising:
one or more light sources, wherein at least one of the one or more optical sensors is configured to detect a reflection of light generated from at least one of the one or more light sources that has passed through the user.

4. The watch of claim 3, where the logic is configured to compensate for a distance between the at least one of the one or more light sources and at least one of the one or more optical sensors.

5. The watch of claim 3, wherein at least one of the one or more light sources is configured to emit light at a different wavelength than another of the one or more light sources.

6. The watch of claim 1, wherein the one or more optical sensors comprise a plurality of ambient light sensors (ALS), and
wherein the logic is further configured to:
discard the generated one or more signals from at least one of the plurality of ambient light sensors, and
change the operating state of the display based on the other of the plurality of ambient light sensors.

7. The watch of claim 1, wherein the one or more optical sensors are an array of optical sensors.

8. The watch of claim 7,
wherein the one or more signals includes one or more first signals generated based on the detected reflection of ambient light in a first wavelength range and one or more second signals generated based on the detected reflection of ambient light in the second wavelength range,
the logic further configured to adjust the one or more first signals using the one or more second signals.

9. The watch of claim 1, wherein at least one of the optical sensors is located on an external component of the watch.

10. The watch of claim 1, further comprising:
one or more filters coupled to the one or more optical sensors and configured to select one or more wavelengths to pass through to the one or more optical sensors,
wherein the logic is further configured to:
determine a type of ambient light based on the one or more wavelengths.

11. The watch of claim 1, further comprising:
one or more of light channels, collecting optics, and reflective surfaces configured for directing the detected reflection of ambient light to walls of the one or more optical sensors, wherein a receiving surface of the one or more light channels is located on a same plane as a detection area of the one or more optical sensors.

12. A method for adjusting one or more properties of a display included in a watch, the watch including one or more optical sensors, the method comprising:
detecting a reflection of ambient light, from a source external to the watch, that has passed through a user using the one or more optical sensors, wherein the one or more optical sensors are located on a second surface of the watch;
generating one or more signals based on the detected reflection of ambient light; and
changing an operating state of the display based on the one or more signals, wherein the display is located on a first surface, opposite the second surface, of the watch.

13. The method of claim 12, wherein the watch further includes one or more light sources, the method further comprising:
generating light from the one or more light sources; and
detecting a reflection of the light from the one or more light sources that has passed through the user using the one or more optical sensors.

14. The method of claim 12, wherein changing the operating state of the display comprises changing a brightness or a color balance of the display based on the one or more signals.

15. The method of claim 12, further comprising:
filtering the detected reflection of ambient light at one or more wavelengths; and
determining a type of light from the filtered detected light, wherein changing the operating state of the display is based on the type of light.

16. The method of claim 15, further comprising:
determining an environmental status based on the type of light, the environmental status including indoors or outdoors;
storing data associated with the detected reflection of ambient light in memory;
determining an amount of time the user is exposed to the environmental status;
comparing the amount of time to a pre-determined threshold; and
notifying the user when the amount of time exceeds the pre-determined threshold.

17. The method of claim 12, further comprising:
determining a modulation characteristic of the detected reflection of ambient light; and
determining a type of light from the modulation characteristics, wherein changing the operating state of the display is based on the type of light.

18. The method of claim 12,
wherein generating the one or more signals includes:
generating one or more first signals based on the detected reflection of ambient light in a first wavelength range, and
generating one or more second signals based on the detected reflection of ambient light in a second wavelength range; and
adjusting the one or more first signals using the one or more second signals.

19. The method of claim 12, wherein detecting the reflection of ambient light includes determining a spectrum of the ambient light, the method further comprising:
responsive to the spectrum including ultraviolet light, retrieving presets values associated with a color balance for indoor conditions, wherein changing the operating state of the display comprises changing the color balance of the display using the preset values.

20. The method of claim 12, wherein detecting the reflection of ambient light includes determining a spectrum of the ambient light, the method further comprising:
comparing a spectral power in one wavelength band of the spectrum to a spectral power in another wavelength band of the spectrum; and
determining an environmental condition based on the comparison.

* * * * *